(12) United States Patent
Lee

(10) Patent No.: US 11,733,123 B1
(45) Date of Patent: Aug. 22, 2023

(54) SYSTEM AND METHOD FOR LEAK DETECTION BY FLOW MATCHING

(71) Applicant: Kenneth Lee, Jacksonville, FL (US)

(72) Inventor: Kenneth Lee, Jacksonville, FL (US)

( * ) Notice: Subject to any disclaimer, the term of this patent is extended or adjusted under 35 U.S.C. 154(b) by 0 days.

(21) Appl. No.: 18/298,920

(22) Filed: Apr. 11, 2023

(51) Int. Cl.
G01M 3/28 (2006.01)
E03B 7/00 (2006.01)

(52) U.S. Cl.
CPC ............ G01M 3/28 (2013.01); E03B 7/003 (2013.01)

(58) Field of Classification Search
CPC ....... G01M 3/00; G01M 3/26–28; E03B 7/00; E03B 7/003; E03B 7/04–08
See application file for complete search history.

(56) References Cited

U.S. PATENT DOCUMENTS

| | | |
|---|---|---|
| 4,561,291 A | 12/1985 | Ainlay |
| 4,932,241 A | 6/1990 | Carmody et al. |
| 5,343,737 A | 9/1994 | Baumoel |
| 5,495,750 A | 3/1996 | Dufresne |
| 6,339,953 B1 | 1/2002 | Ashworth |
| 9,834,911 B2 | 12/2017 | Everhart |
| 10,428,495 B2 | 10/2019 | Halimi |
| 10,809,146 B2 | 10/2020 | Weidner |
| 11,262,269 B2 * | 3/2022 | Davidson ............ G01M 3/2807 |
| 11,402,292 B1 * | 8/2022 | Lee ........................ G01M 3/28 |
| 2004/0118186 A1 | 6/2004 | Shultis |
| 2005/0016261 A1 | 1/2005 | Yoncuski |
| 2005/0252279 A1 | 11/2005 | Newman |
| 2007/0289635 A1 | 12/2007 | Ghazarian et al. |
| 2019/0285505 A1 | 9/2019 | Farkas |
| 2020/0157784 A1 | 5/2020 | Trescott |
| 2020/0256042 A1 * | 8/2020 | Bailey ...................... G01M 3/28 |
| 2020/0264068 A1 | 8/2020 | Mess et al. |
| 2020/0340220 A1 | 10/2020 | Bailey et al. |
| 2020/0400529 A1 | 12/2020 | Cerenzia et al. |

OTHER PUBLICATIONS

"Sentry Flow Meter", betterwaterind.com, Nov. 19, 2012.

* cited by examiner

Primary Examiner — Nguyen Q. Ha
(74) Attorney, Agent, or Firm — Schultz & Associates, P.C.

(57) ABSTRACT

The present invention is a system and method for quickly and efficiently detecting water leaks and leak flow rates in plumbing systems which can include flexible materials and components. The preferred system is comprised of a static device (known as a "water widget"), an expansion gauge temporarily connected to the physical system through a controllable manifold, a mathematical model (known as a "phantom water widget"), and a software program which accepts input related to the physical system and which outputs a result.

20 Claims, 16 Drawing Sheets

SYSTEM AND METHOD FOR LEAK DETECTION BY FLOW MATCHING

FIELD OF THE INVENTION

The present invention relates to water leak detection methods.

BACKGROUND OF THE INVENTION

Residential plumbing systems typically have many components, such as joints, valves, and spigots which are prone to leaks. Many possible failure points exist in these components, many of which are not visible or accessible. As a result, leaks often arise which may go unrepaired for extended periods of time causing extensive damage. Determining whether or not a water leak exists and then finding the leakage rate in a plumbing system can be a very complex problem.

To complicate matters, most modern plumbing systems include flexible components, such as water heaters, which vary in volume according to water pressure. Similarly, many modern plumbing systems utilize flexible materials, such as PEX tubing, which expand and contract depending on temperature and pressure. A plumbing system which utilizes flexible materials, such as PEX tubing, may have a different leak rate over time than a system which includes only traditional materials. As a result, it is difficult to accurately determine the flow rate of a leak in a system which utilizes flexible materials or components.

The prior art has attempted to address these problems, but all have fallen short.

For example, it is known to monitor a city water meter at the main supply line to determine whether or not a leak exists. But the method of monitoring a city water meter is incapable of locating small leaks because of the extended period of time required. Further, the method of monitoring a city water meter fails to account for the problem of leak rate variation due to flexible materials.

As another example, U.S. Publication No. 2020/0264068 to Mess, et al. discloses a system and method for determining a flow rate based on pressure variations. However, Mess requires permanent installation of a device. Furthermore, Mess does not account for flexible components or material expansion.

Another example, U.S. Publication No. 2019/0285505 to Farkas discloses a system and method for detecting a leak using a temporarily installed flow meter. However, Farkas does not disclose a method for determining the flow rate of a leak and does not account for flexible components or material expansion.

As another example, U.S. Pat. No. 10,428,495 to Halimi disclosed a leak detection device using a temporary pressure sensor. However, Halimi does not disclose an accurate means of measuring the leak flow rate.

As a result, the prior art has failed to provide an adequate and simple means for detecting leaks and calculating leak flow rate in modern plumbing systems in residential structures.

Thus, there is a need for a system to efficiently determine whether or not a leak exists, and, if so, the leak rate in a system which employs flexible materials and components.

SUMMARY OF THE INVENTION

The present invention is a system and method for quickly and efficiently detecting water leaks and leak flow rates in plumbing systems which can include flexible materials and components. The preferred system is comprised of a static device (known as a "water widget"), an expansion gauge temporarily connected to the physical system through a controllable manifold, a mathematical model (known as a "phantom water widget"), and a software program which accepts input related to the physical system and which outputs a result.

By way of general explanation and analogy, electrical engineers are often taught to use the principle of "equivalent circuit" that results in the correct answer to a problem too complex to solve by brute force methods. This same generalized principal is used in the invention to determine the flow rate of a leak in a flexible plumbing system by use of a mathematical model.

The "phantom water widget" model is used to mathematically represent the difference between the volume of water in a pressurized flexible plumbing system versus a non-pressurized system. In a preferred embodiment, the phantom water widget is a model of a hypothetical hollow cylinder having the same length as the physical water widget, but an unknown diameter which is assumed to be connected to the plumbing system. The water widget and expansion gauge, connected to the manifold, are used to determine the diameter of the phantom water widget. The leak flow rate is then mathematically derived as being equal to the volume change in both the phantom water widget and the water widget over time.

In use, a manifold assembly is attached to an exterior faucet of the plumbing system under inspection. The manifold assembly includes the water widget, an expansion gauge, and a number of control valves. The plumbing system is pressurized and the water level in the water widget is monitored for a sufficient period of time to allow the pressure to stabilize. If the water level in the water widget falls, a leak detection is registered. A leak rate is then determined by using the phantom water widget, the water widget, and expansion gauge, as will be further described.

If a leak exists, then the manifold is drained and repressurized until the water level is at the zero line in the expansion gauge. When the system is pressurized the pressure and water level in the phantom water widget are assumed to be equivalent to the pressure and water level in the water widget. The valve for the expansion gauge is opened briefly to let a small amount of water into the expansion gauge. The water level of the phantom water widget and water widget both fall at the same rate because they are assumed to have the same pressure. Thus, water diverted into the expansion gauge comes from both the water widget and the phantom water widget. The valve for the expansion gauge is closed. The valve for the water widget is also closed. The difference between the volume of water lost in the water widget and the volume of water gained in the expansion gauge is assumed to be equal to the volume of water lost from the phantom water widget. The difference in water level in the phantom water widget is equal to the difference in water level in the water widget. Hence, the cross-sectional area of the phantom water widget may be determined using the volume of water lost from the phantom water widget and the difference in water level in the water widget.

Once the cross-sectional area of the phantom water widget is determined, the plumbing system is repressurized. In a preferred embodiment, the time it takes for the water level to fall from 100 psi to 50 psi is recorded and the flow rate is calculated using the volumes of the phantom water widget and the water widget combined. A mobile software application is used as a timer and may be used to calculate the phantom water widget cross-sectional area and the leak flow rate based on data input by the user.

Further, an adjustable external leak matching the flow rate of the leak within the plumbing system may be used to determine the leak rate. In a preferred embodiment two elapsed times are taken for the water level in the water widget fall from a high level to a low level. The first elapsed time is taken with only the internal leak within the plumbing system present. The second elapsed time is taken with an additional external leak present. When the second elapsed time is equal to about half of the first elapsed time, then the flowrate of the external leak and the internal leak within the plumbing system is about equal. Since the flow rate of the external leak matches the flowrate of the leak within the plumbing system, the volume of water lost by the external leak is equivalent to the volume of water lost by the internal leak. Therefore, a measuring container may be used to determine the volume of water lost by the external leak, and, more importantly, the leak rate of the internal leak within the plumbing system. A mobile software application is used to calculate the leak rate the leak rate of the internal leak.

DETAILED DESCRIPTION OF THE INVENTION

In the description that follows, like parts are marked throughout the specification and figures with the same numerals, respectively. The figures are not necessarily drawn to scale and may be shown in exaggerated or generalized form in the interest of clarity and conciseness. All tolerances and usage of the term "about" are ±20%, unless otherwise specified.

Figure 1A:
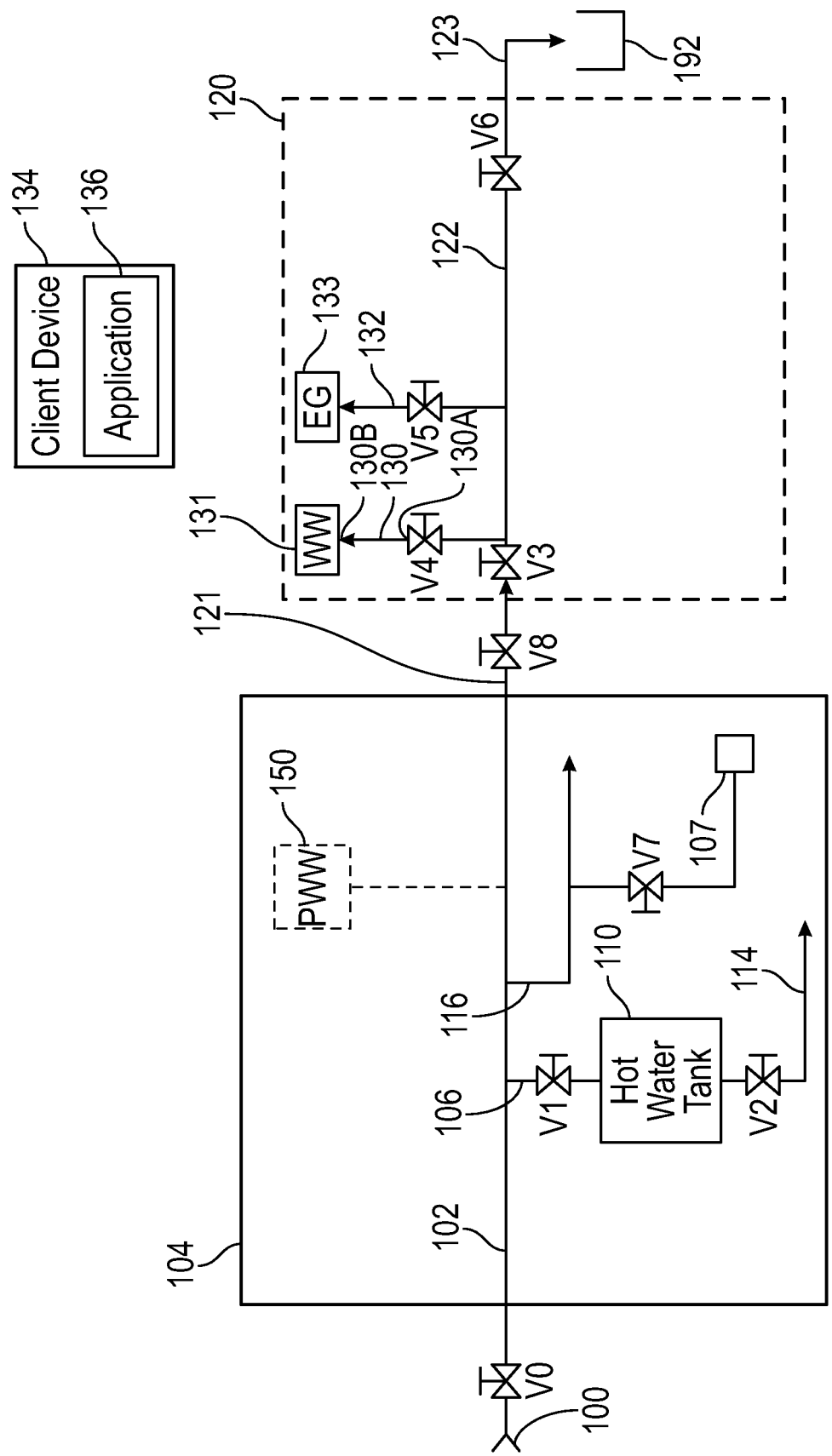
FIG. 1A is a preferred embodiment of a leak detection system.

Referring then to FIG. 1A, a preferred leak detection system will be described. The leak detection system is generally comprised of client device 134, and manifold assembly 120. Manifold assembly 120 includes manifold 122, water widget device ("WW") 131, and expansion gauge ("EG") 133. WW 131 and EG 133 may both be considered monometer type monitoring cylinders. Client device 134 is preferably a mobile computing device, such as a smart phone or tablet, and includes application 136. Application 136 includes a timer. Various water levels observed from WW 131 and EG 133 during the method are input into application 136 to calculate the leak rate, as will be further described.

Manifold 122 is connected to residential structure 104. Structure 104 and the plumbing system described in it are just examples. One of skill will recognize that many other structures and variations of plumbing systems are possible and can be analyzed for leaks with the system and method disclosed.

In this example, structure 104 includes main line 102. Supply line 100 is connected to main line 102. Water flow to main line 102 is controlled by supply valve V0. In a preferred embodiment, supply line 100 is a city water main.

Main line 102 is further connected to line 106, cold-water lines 116, and exterior faucet 121. Exterior faucet 121 includes faucet valve V8. Line 106 connects the main line to hot water tank 110. Water flow to hot water tank 110 is controlled by valve V1. Hot water tank 110 is further connected to hot water lines 114. Water flow to hot water lines 114 is controlled by valve V2.

Cold-water lines 116 extend to all cold-water lines in structure 104. Structure 104 also includes at least one toilet valve V7 connected to toilet 107 and cold-water lines 116.

Figure 1B:
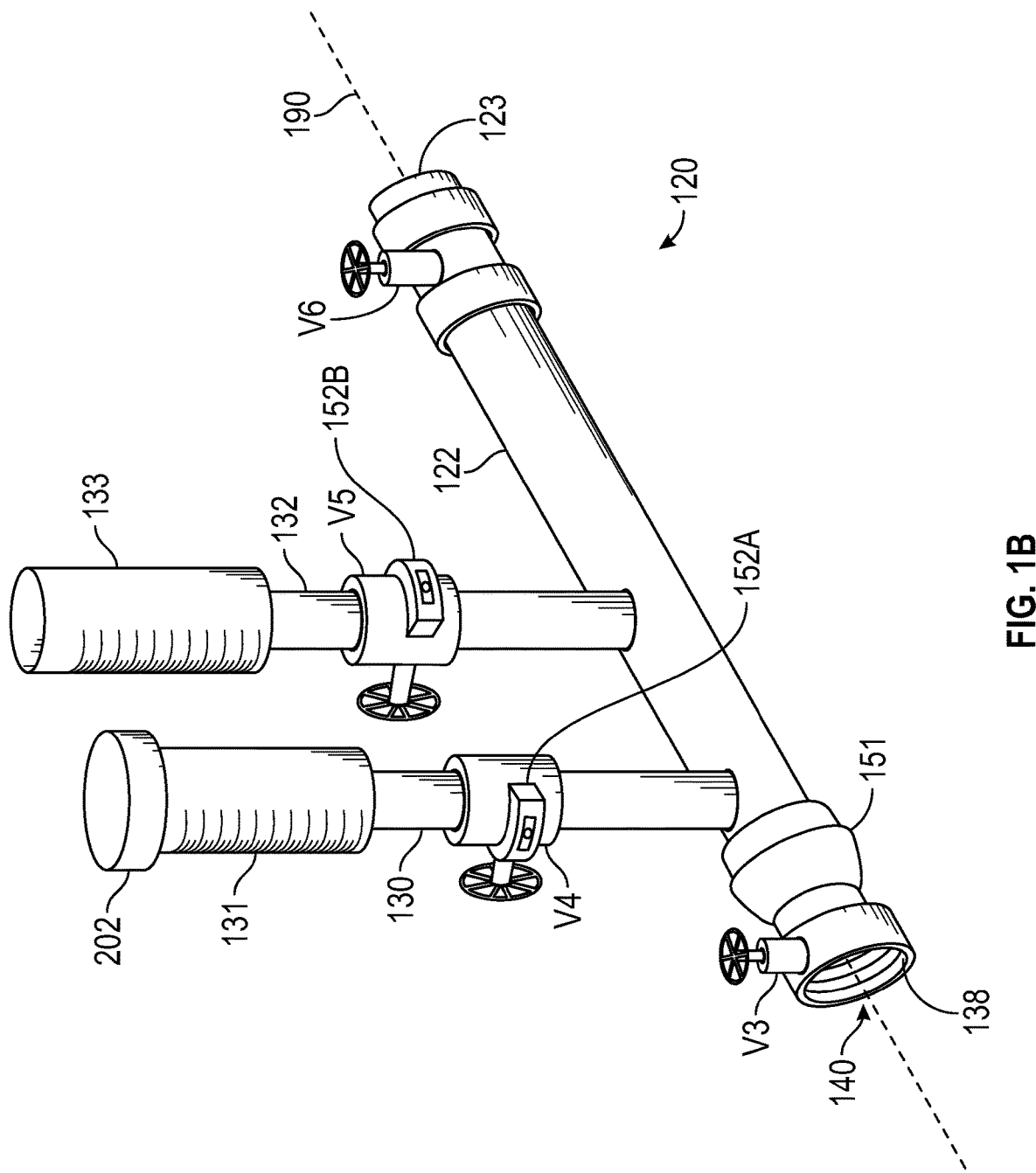
FIG. 1B is a preferred embodiment of a manifold assembly.

Referring also to FIG. 1B, manifold 122 can be seen to have longitudinal central axis 190. Exterior faucet 121 is connected to activation valve V3 of manifold 122 by threaded connector 138 at manifold end 140. In a preferred embodiment, manifold assembly 120 is comprised of WW 131, EG 133, and manifold 122. WW 131 is connected to manifold valve V4 of manifold 122 via line 130. Manifold valve V4 includes bubble levels 152A and 152B. Preferably, bubble level 152A is positioned on valve V4 and is perpendicular to longitudinal central axis 190. Similarly, bubble level 152B is positioned on valve V5, However, bubble level 152B is oriented parallel with longitudinal central axis 190. EG 133 is connected to manifold valve V5 of manifold 122 via line 132. Manifold 122 also includes manifold valve V6. Manifold valve V6 controls water output through outlet 123. Water flow to WW 131 and EG 133 are controlled by manifold valves V4, and V5, respectively.

Manifold 122 is generally cylindrical and includes ball coupling joint 151. The ball coupling joint is important because it allows WW 131 to be adjustably oriented vertically during use. The ability to adjust the WW to a vertical orientation is a great improvement because it allows for more accurate measurements of water levels.

PWW model 150 is presumed to be attached to main line 102 inside structure 104, as will be further described. Cylindrical container 192 is removably positioned under outlet 123 to catch out flowing water for measurement purposes, as will be further described.

Figure 1C:
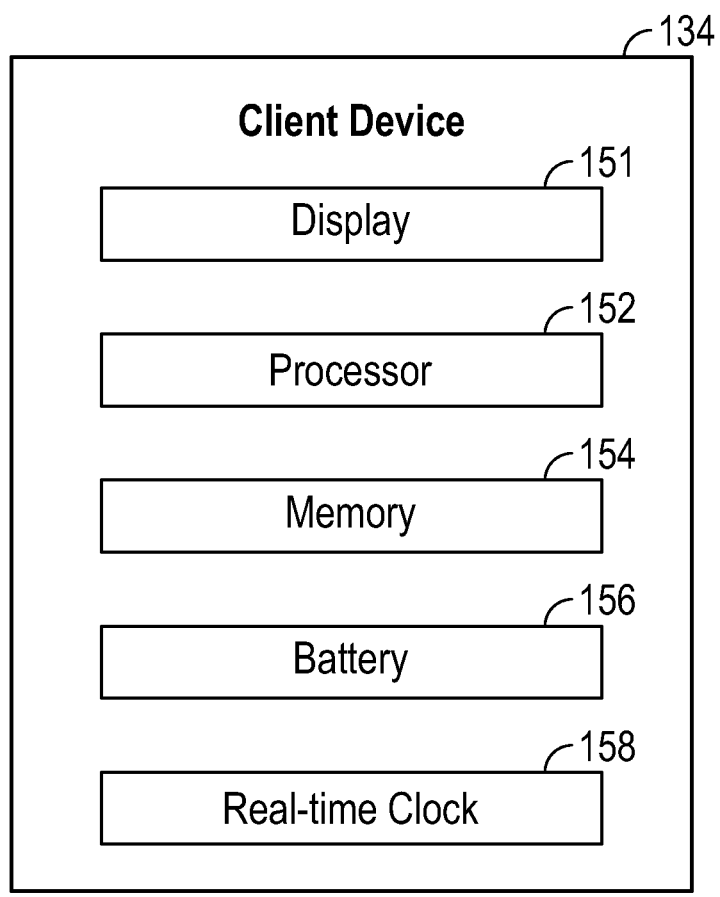
FIG. 1C is a block diagram of the components of a preferred embodiment of a client device.

Referring then to FIG. 1C, a preferred embodiment of client device 134 will be further described.

Client device 134 is comprised of display 151, processor 152, memory 154, battery 156, and real time clock (RTC) 158. Memory 154 stores application 136 and input water level data. RTC 158 is used to track elapsed time, as will be further described.

Figure 2:
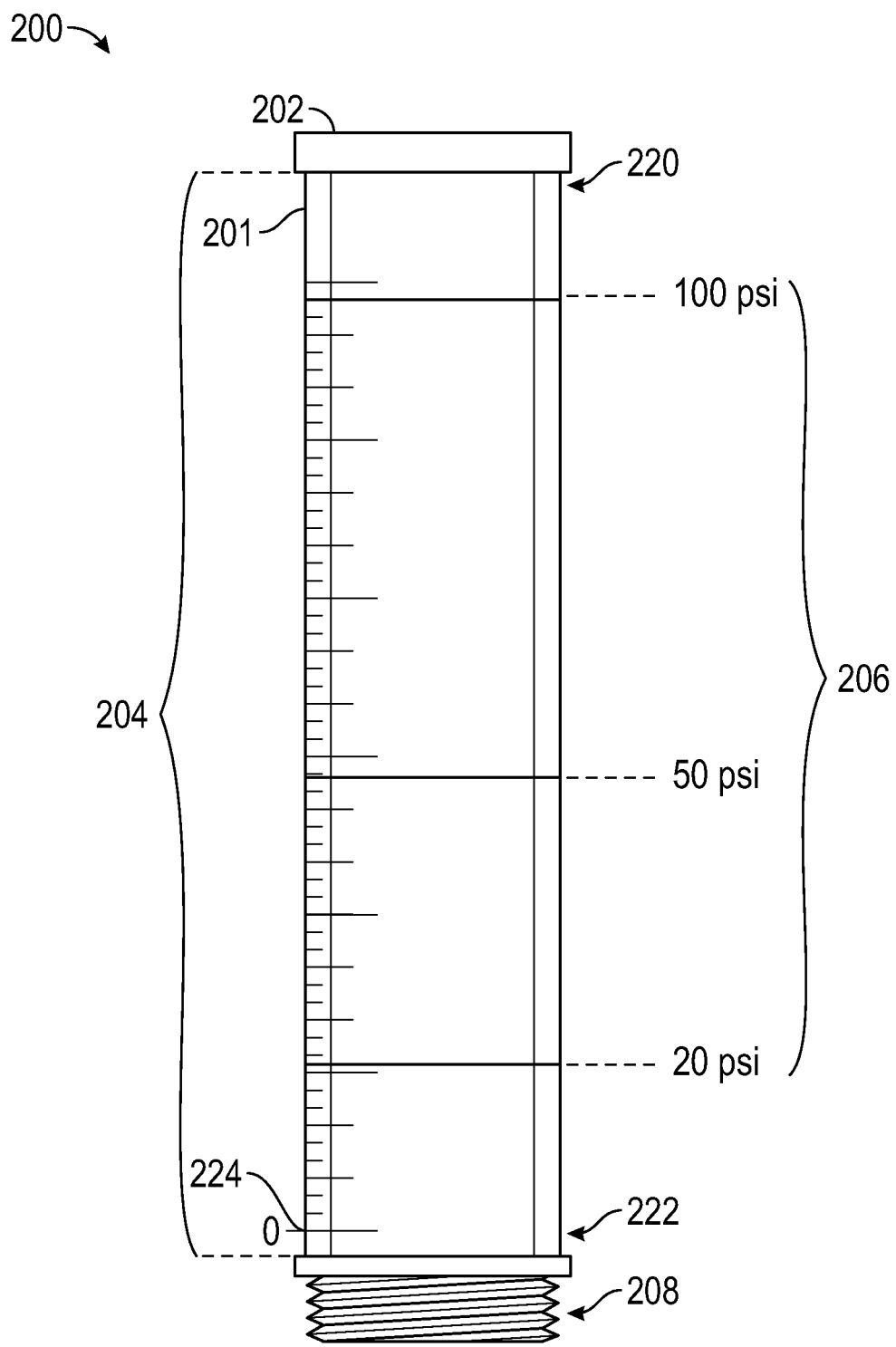
FIG. 2 is a preferred embodiment of a water widget.

Referring then to FIGS. 1B and 2, WW 131 is comprised of body 201. In a preferred embodiment, body 201 is a translucent or transparent rigid PVC tube that is approximately 40 inches long and has an approximate diameter of 1 inch. Top end 220 is sealed via removable cap 202. In an alternate embodiment, cap 202 is not removable. Bottom end 222 includes threaded connector 208 which is adapted to connect to line 130. In use, the longitudinal central axis of WW 131 is positioned vertically.

In a preferred embodiment, WW 131 includes indicator lines 206. Indicator lines 206 include demarcations for 100 pounds per square inch (psi), 50 psi, and 20 psi. In a preferred embodiment, the indicator lines are engraved on WW 131 based on the standard air pressure at sea level, 14.7 PSI. The locations of the indicator lines are calculated using Boyle's Law, $p^1v^1=p^2v^2$. Thus, when the WW is 40 inches in length, the indicator lines for 100 psi, 50 psi, and 20 psi are located at approximately 5.88, 11.76, and 29.4 inches from top end 220, respectively. Other gradations may of course be used.

WW 131 also includes water level indicator lines 204. In a preferred embodiment, water level indicator lines 204 range from 0 to 36 inches, beginning with zero indicator line 224 at bottom end 222 and proceeding upward towards top end 220. The water level indicator lines are positioned about every tenth of an inch with larger indicator lines and numerals indicating each inch.

In alternate embodiments, different WW dimensions and indicator lines may be used. Similarly, different units may be used to indicate pressure and water level.

Figure 3:
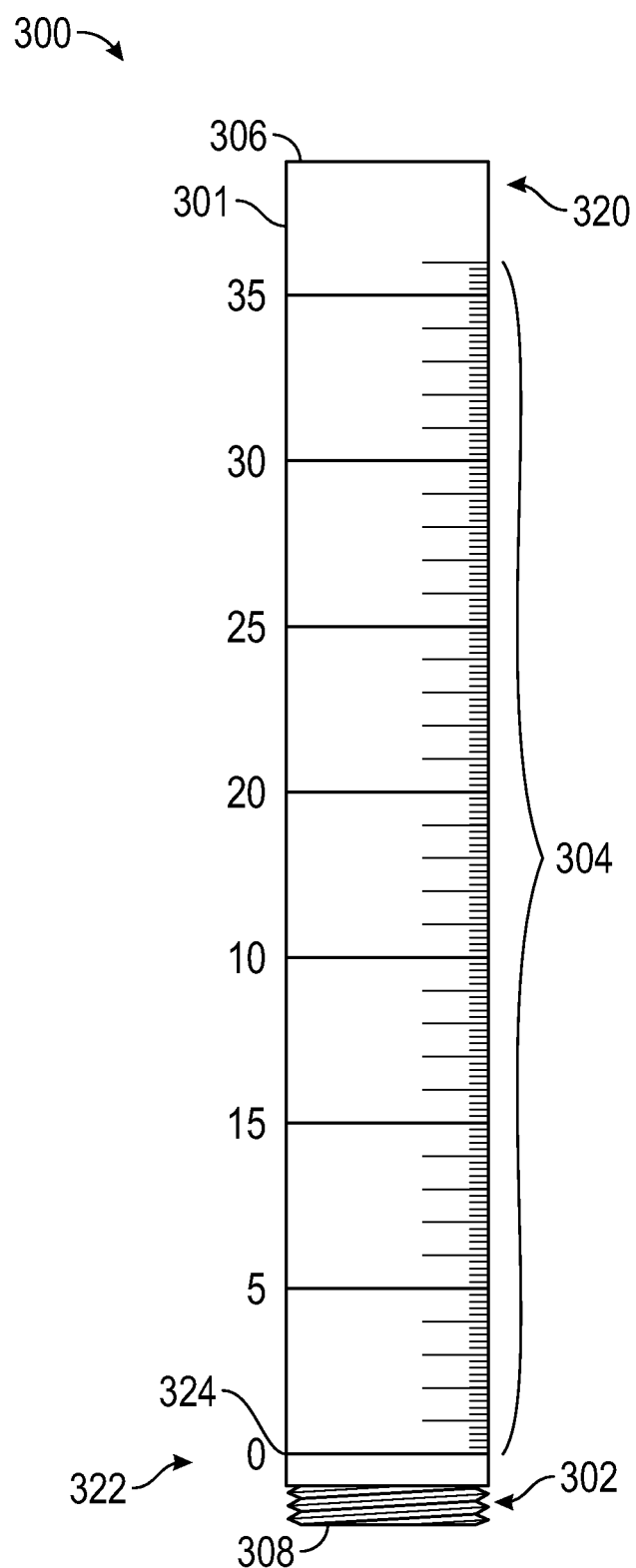
FIG. 3 is a preferred embodiment of an expansion gauge.

Referring then to FIGS. 1B and 3, EG 133 will be further described.

EG 133 is comprised of body 301. In a preferred embodiment, body 301 is a translucent or transparent rigid PVC tube that is approximately 40 inches long and has an approximate diameter of 1 inch. Body 301 includes open end 306 and open end 308. Bottom end 322 of body 301 includes open end 308 and threaded connector 302. Threaded connector 302 is adapted to connect to line 132. In use, EG 133 is positioned vertically along a central axis parallel with the longitudinal axis of WW 131.

EG 133 includes water level indicator lines 304. In a preferred embodiment, water level indicator lines 304 range from 0 to 36 inches, beginning with zero indicator line 324 at bottom end 322 and proceeding towards top end 320. The indicator lines are positioned about every tenth of an inch. Other gradations may of course be used.

Figure 4:
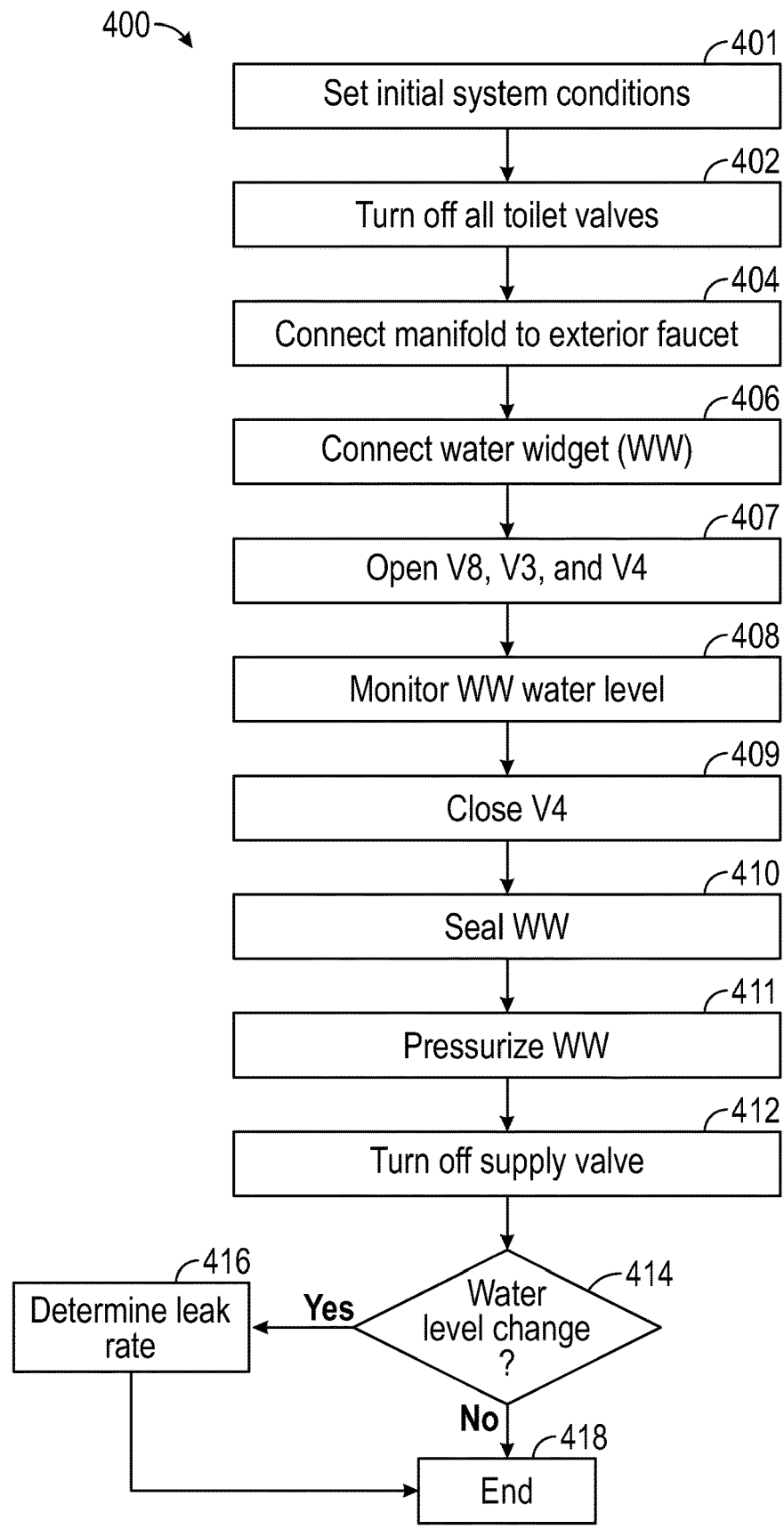
FIG. 4 shows a flow chart of a preferred method for determining a leak.

Referring then to FIGS. 1A and 4, preferred method 400 for determining whether or not a leak exists will be further described.

At step 401, initial conditions are set. Supply valve V0 is open. Faucet valve V8, activation valve V3, and manifold valves V4, V5, and V6 are all closed. Main line 102, cold water lines 116, and hot water lines 114 are presumed to be filled with water. Valves V1, V2, and V7 are open.

At step 402, optionally, all toilet valves in the plumbing system, such as V7, are closed.

At step 404, manifold 122 is connected to exterior faucet 121 via threaded connector 138.

At step 406, if not already done, WW 131 is attached to line 130 via the threaded connector 208.

At step 407, activation valve V3, faucet valve V8, and manifold valve V4 are opened.

At step 408, the water level in WW 131 is monitored until it is approximately equal to zero indicator line 224.

At step 409, manifold valve V4 is closed.

At step 410, removable cap 202 is sealed to top end 220 of WW 131.

At step 411, manifold valve V4 is opened to pressurize WW 131. Typically, when the WW is pressurized the water level will rise near or above the 100-psi indicator line and stabilize. In an alternate embodiment, where cap 202 is not removable, steps 408 through 411 are not necessary.

At step 412, supply valve V0 is closed to disconnect the plumbing system from supply line 100.

At step 414, the water level in WW 130 is monitored. If the water level remains steady for a period of more than about 90 seconds, then it is determined that no leak is present, and the method proceeds to step 418 and ends. If the water level falls after a period of about 90 seconds, then a leak condition is assumed to exist, and the method proceeds to step 416.

At step 416, a leak rate is calculated, as will be further described.

Figure 5A:
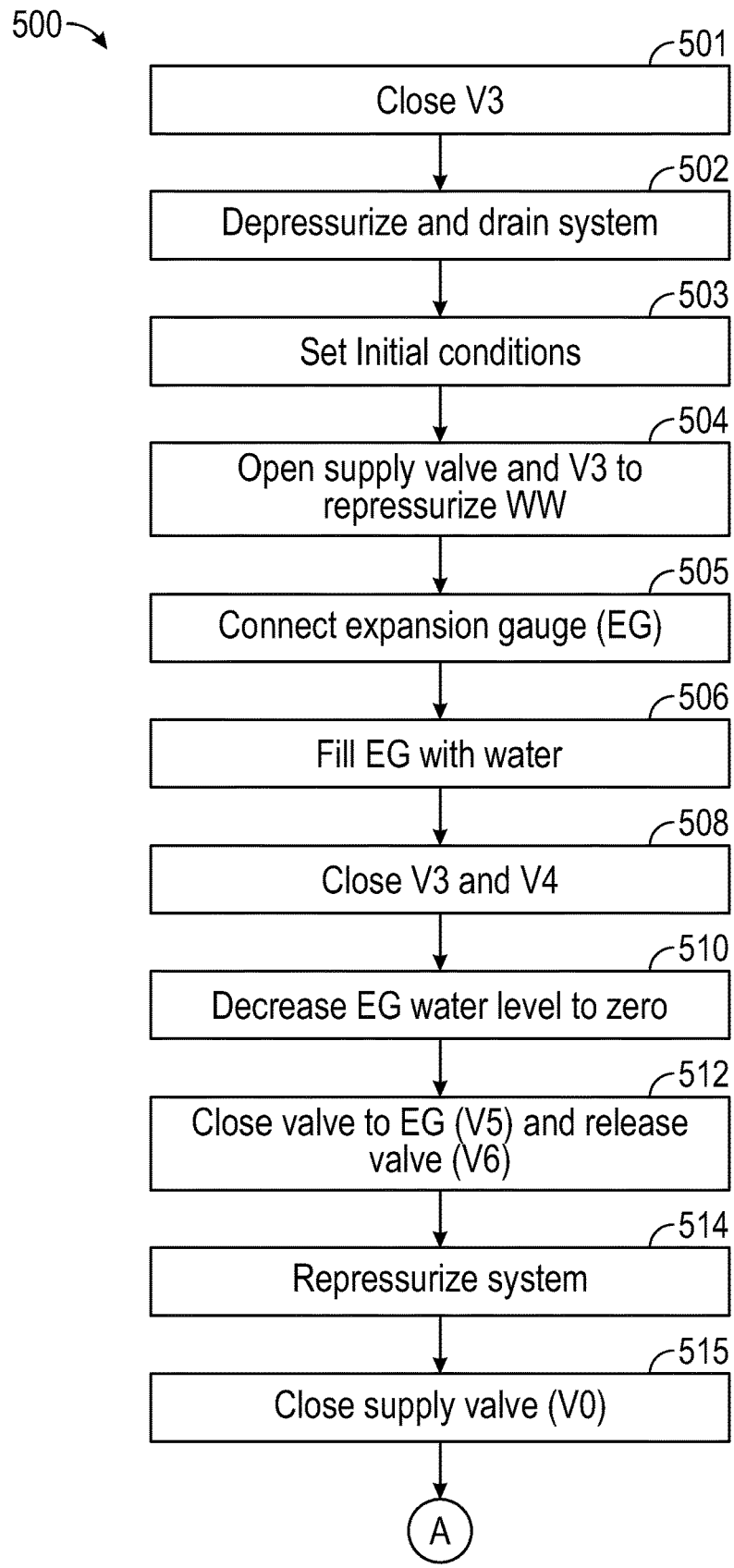
FIGS. 5A and 5B show a flow chart of a preferred method for calculating a leak rate.
Figure 5B:
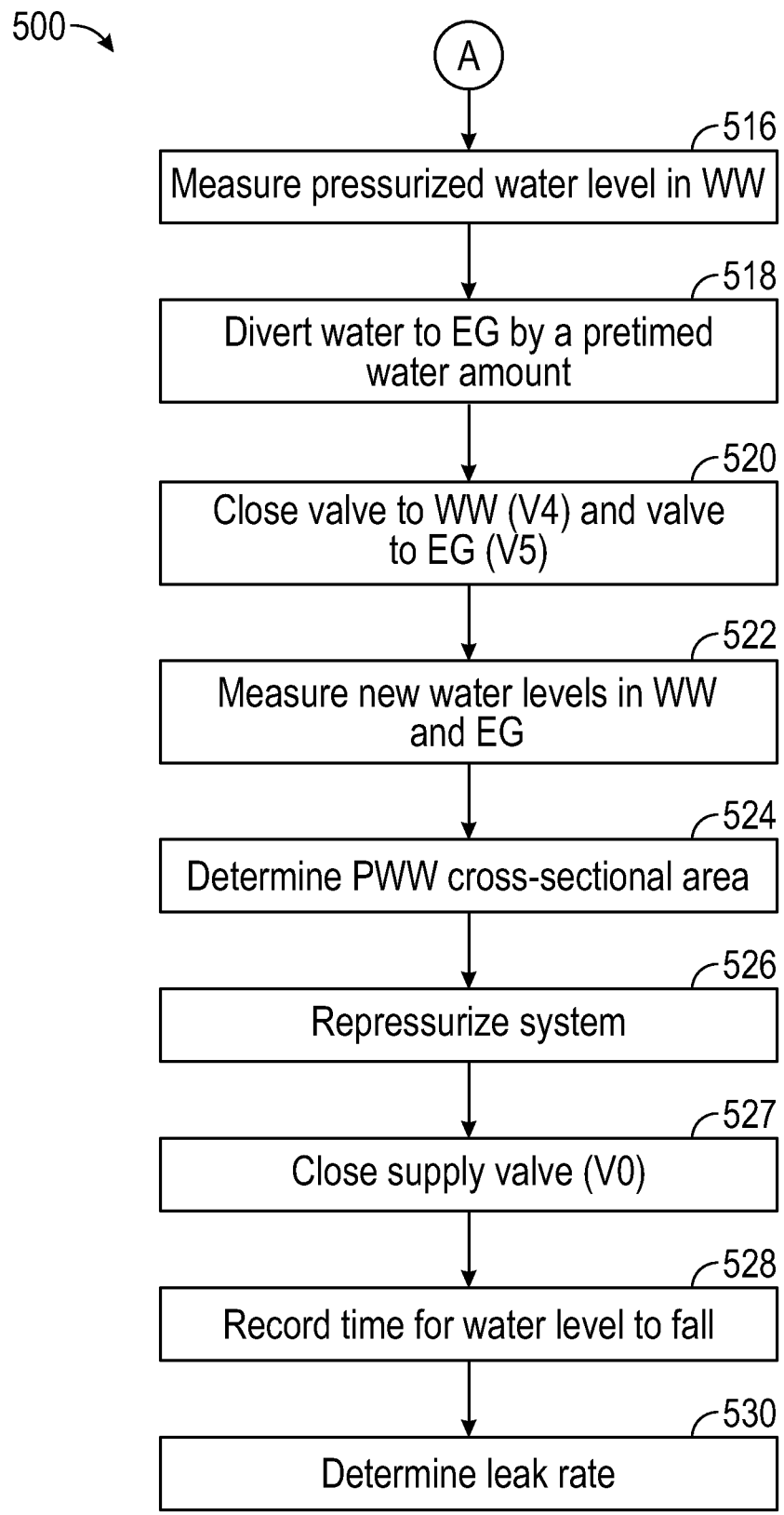

Referring then to FIGS. 1A, 5A, and 5B, preferred method of step 416 for determining the leak will be further described.

In general, to determine the leak rate, the water volume attributable to system expansion, represented as PWW model 150, is first determined. The PWW model is a mathematical pressure model used to account for expansion of the plumbing system (e.g., plastic pipe expansion and the compression of compressible fluids, such as air trapped in sealed components, such as the hot water heater). For the purpose of determining the area of the PWW model, it is assumed that the PWW model is a closed cylinder, having a constant cross-section and a length of about 40 inches.

When the plumbing system is pressurized, a certain percentage of water pressure is required to force the flexible materials and components to expand. When there is a leak, the water will first escape from all pressurized water sources, such as the PWW model and WW. As water escapes, the water level in PWW model 150 and WW 131 fall, simultaneously. It is assumed that the leak rate is equal to the volume of water which escapes from PWW model 150 and WW 131 over a period of time. Thus, in order to determine the leak rate, the volume of water expanding into PWW model 150 must be determined.

At step 501, activation valve V3 is closed.

At step 502, manifold assembly 120 is depressurized and drained, preferably by opening manifold valve V6.

At step 503, if not already done, initial conditions are set. The plumbing system is arranged so that the manifold assembly is connected to exterior faucet 121 via threaded connector 138. Valves V1, V2, faucet valve V8, and manifold valve V4 are open. Supply valve V0, activation valve V3, and manifold valves V5, and V6 are closed. Optionally, toilet valve V7 is closed.

At step 504, supply valve V0 and activation valve V3 are opened to pressurize WW 131. The PWW model 150 is also assumed to be pressurized.

At step 505, if not already done so, EG 133 is connected to line 132 of manifold assembly 120 by connecting line 132 to threaded connector 302. At this step, EG 133 is positioned vertically with top end 320 facing upwards.

At step 506, manifold valve V5 is opened to fill EG with water. In a preferred embodiment, the EG is filled to a level of between about the 15 and about the 30-inch indicator lines.

At step 508, activation valve V3 and manifold valve V4 are closed.

At step 510, manifold valve V6 is opened to lower the water level in EG 133 to zero indicator line 324. In an alternate embodiment, this step is optional as the initial water level of the EG may be recorded and input into the mobile application, as will be further described.

At step 512, manifold valves V5 and V6 are closed.

At step 514, activation valve V3 and manifold valve V4 are opened to pressurize WW 131 and PWW model 150.

Preferably, the system is considered pressurized when the water level in WW 131 remains constant for at least 5 to 10 seconds.

At step 515, supply valve V0 is closed.

At step 516, the water level in WW 131 is measured and input into the mobile application, as will be further described. The water level is measured to the nearest $10^{th}$ of an inch using water level indicator lines 204. The water level in PWW model 150 is assumed to be equal to the water level in WW 131.

At step 518, manifold valve V5 is briefly opened to allow a small amount of water into EG 133. The water diverted to EG 133 comes from WW 131 and PWW model 150. In a preferred embodiment, "briefly" means approximately 0.3 to 0.5 seconds. As a result, the relative water levels in WW 131 and PWW model 150 decrease equally.

At step 520, manifold valves V5 and V4 are closed. Ideally both valves are closed simultaneously.

At step 522, the water levels in WW 131 and EG 133 are measured and input into the mobile application, as will be further described. The water levels are preferably measured to the nearest $10^{th}$ of an inch using water level indicator lines 204 and 304, respectively.

At step 524, the cross-sectional area of PWW model 150 is determined, preferably, by the mobile application, as will be further described.

At step 526, supply valve V0 and manifold valve V4 are opened to pressurize WW 131 and PWW model 150. Preferably, the system is considered pressurized when the water level in WW 131 remains constant for at least 5 to 10 seconds.

At step 527, supply valve V0 is closed.

At step 528, a measurement is taken of the time it takes for the water level in WW 131 to fall from about 100 psi to about 50 psi and is entered in the mobile application, as will be further described. Of course, other pressure drops may be used.

At step 530, the leak rate is determined, preferably by the mobile application, as will be further described.

Figure 6:
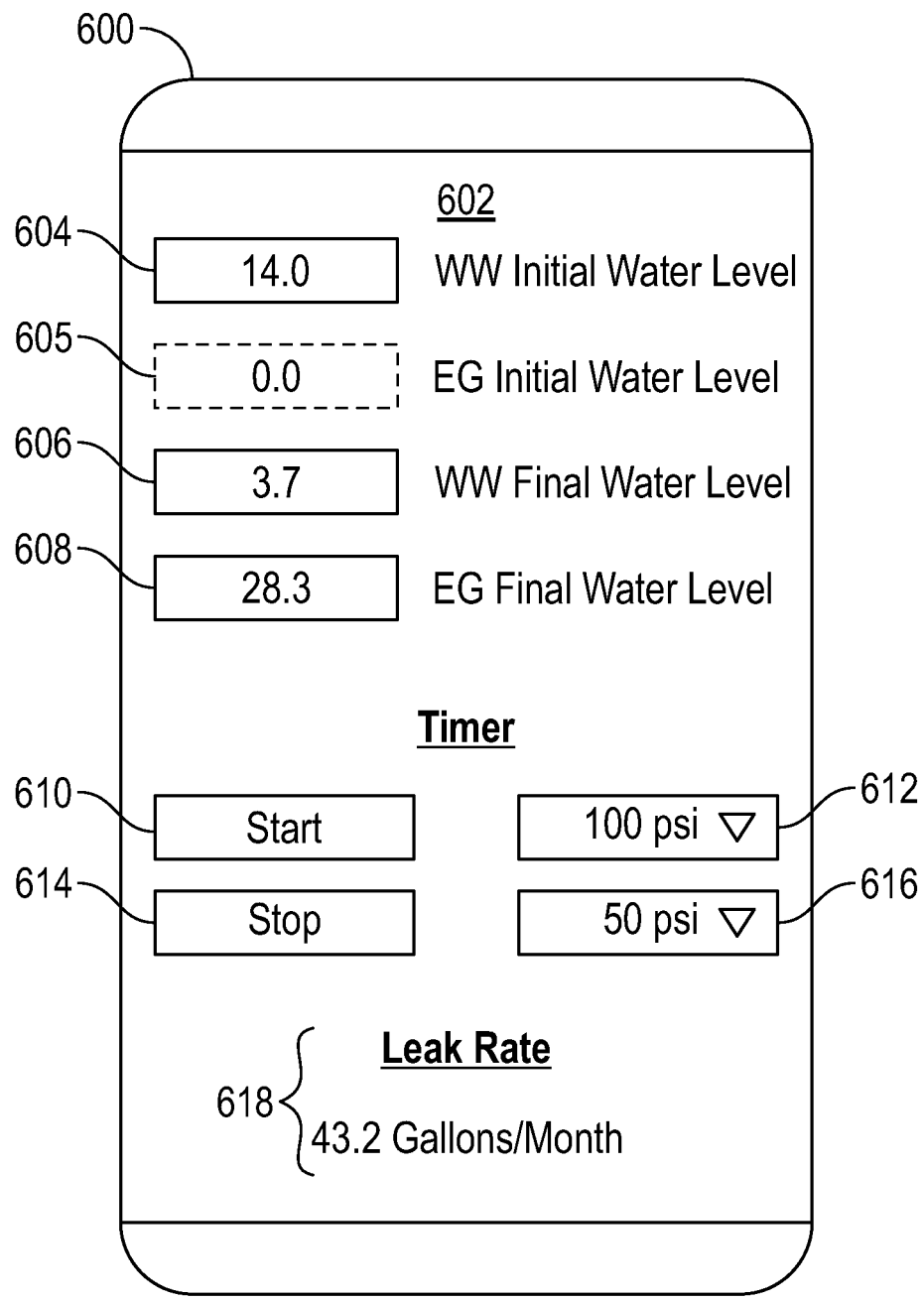
FIG. 6 is a graphical user interface of a mobile application in a preferred embodiment of a leak detection system.

Referring then to FIG. 6, an exemplary user interface of the mobile application will be described.

Mobile application screen 602 is displayed on client device 600. Client device 600 is a mobile device, such as a smart phone or tablet, as previously described.

Mobile application screen 602 includes WW initial water level input box 604, WW final water level input box 606, and EG final water level input box 608. Application 136 defaults to an initial water level of zero for the EG. In an alternate embodiment, mobile application screen 602 includes optional EG initial water level input box 605.

In a preferred embodiment, the water levels are input in inches to the nearest $10^{th}$ of an inch. Of course, other measurements may be used which correspond to the water level indicator lines on the WW and EG.

Mobile application screen 602 is further comprised of start button 610, stop button 614, start drop down 612, and stop drop down 616. The mobile application screen also includes leak rate section 618.

Figure 7:
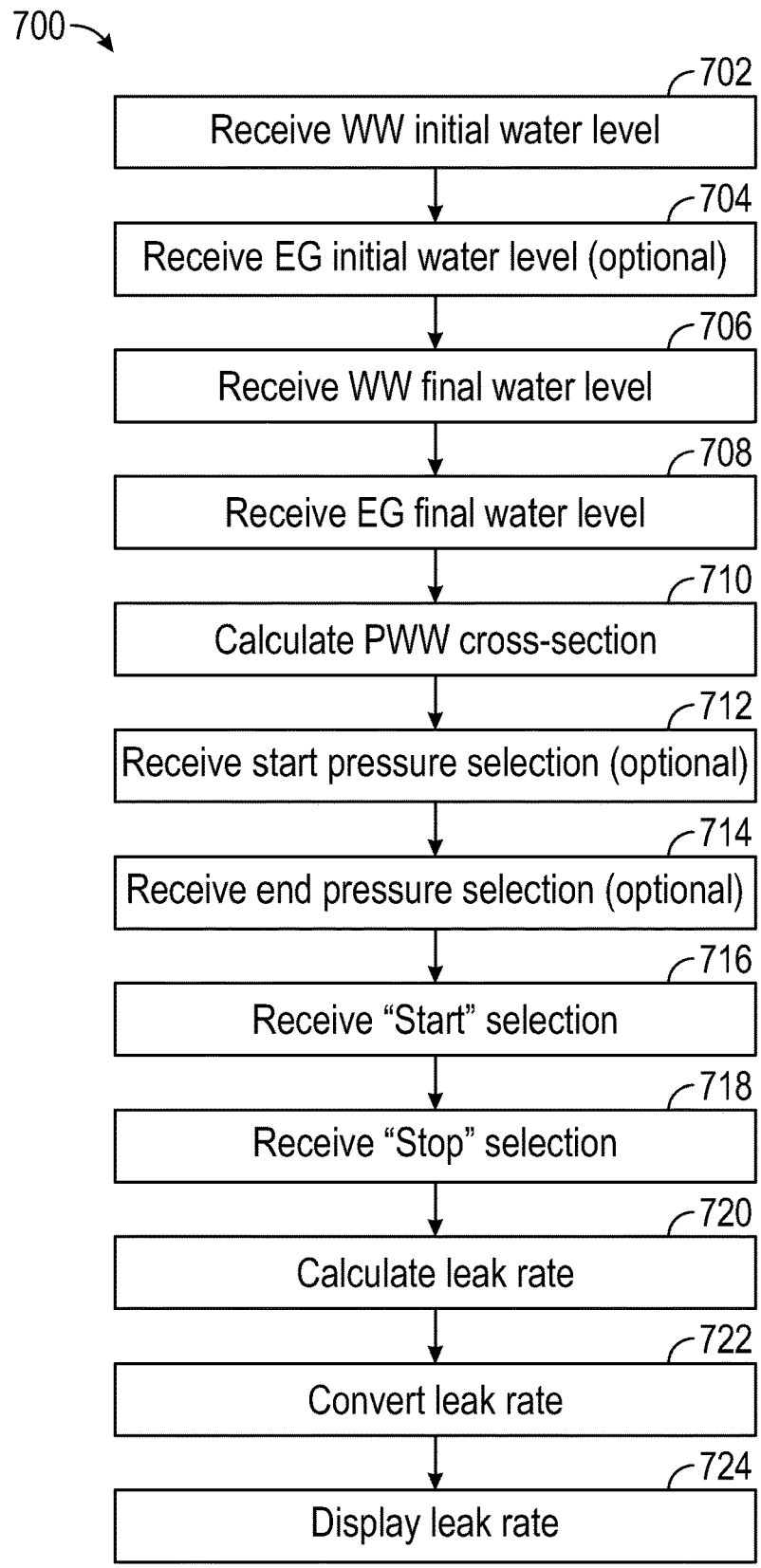
FIG. 7 is a flow chart of a preferred method of use of a mobile application in a preferred embodiment of a leak detection system.

Referring then to FIGS. 6 and 7, preferred method 700 for calculating leak rate will be further described.

At step 702, the mobile application receives a value in input box 604 for the initial water level of WW 131.

At optional step 704, the mobile application receives a value in input box 605 for the initial water level of EG 133. In a preferred embodiment, the method defaults to a zero value for the initial water level of the EG.

At step 706, the mobile application receives a value in input box 606 for the final water level of WW 131.

At step 708, the mobile application receives a value in input box 608 for the final water level of EG 133.

At step 710, the cross-sectional area of PWW model 150 is calculated using the following equation:

$$A^{PWW} = \frac{(h^{EG} - h^{WW})(A^{WW})}{h^{WW}}$$

Where:

$A^{PWW}$ is the cross-sectional area of the PWW model in inches$^2$;

$h^{EG}$ is the height gained in the EG in inches;

$h^{WW}$ is the water level decrease in the WW, which is equivalent to the water level decrease in the PWW model in inches; and, $A^{WW}$ is the cross-sectional area of the WW in inches$^2$.

At optional step 712, the mobile application receives a selection for a starting pressure from drop down 612. In a preferred embodiment, the drop-down defaults to 100 psi as the starting pressure.

At optional step 714, the mobile application receives a selection for an ending pressure from drop down 616. In a preferred embodiment, the drop-down defaults to 50 psi as the ending pressure.

At step 716, a selection of start button 610 is received and the mobile application starts a timer.

At step 718, a selection of stop button 614 is received and the mobile applications stops the timer and stores the elapsed time, t. In a preferred embodiment, t is the time in seconds that it takes for the water level to fall the selected amount, e.g., from the 100-psi indicator line to the 50-psi indicator line.

At step 720, the average leak rate is calculated. In this calculation it is assumed the average leak rate is equivalent to the volume of water lost in the PWW model plus the volume of water lost in the WW over time. In this example, the average leak rate from 100 psi to 50 psi is calculated in cubic inches per second using the following equation:

$$\text{Leak Rate} = \frac{HE}{\frac{x+y}{2x}t}$$

Where:

H is the length in inches between starting pressure and stopping pressure, in this example 100 psi and 50 psi;

E is the sum of the $A^{PWW}$ and $A^{WW}$ in inches$^2$;

t is the elapsed time in seconds;

x is the starting pressure, in this example 100 psi; and, y is the stopping pressure, in this example.

At step 722, the leak rate is converted from cubic inches per second to gallons per month using the following formula:

$$\text{Leak Rate} \frac{in^3}{sec}\left(\frac{3{,}600 \text{ sec}}{1 \text{ hr}} \times \frac{24 \text{ hrs}}{1 \text{ day}} \times \frac{30 \text{ days}}{1 \text{ month}} \times \frac{0.004329 \text{ gallons}}{01 \text{ in}^3}\right) =$$

$$\text{Leak Rate} \frac{\text{gallons}}{\text{month}}$$

At step 724, the leak rate is displayed in leak rate section 618.

Figure 8A:
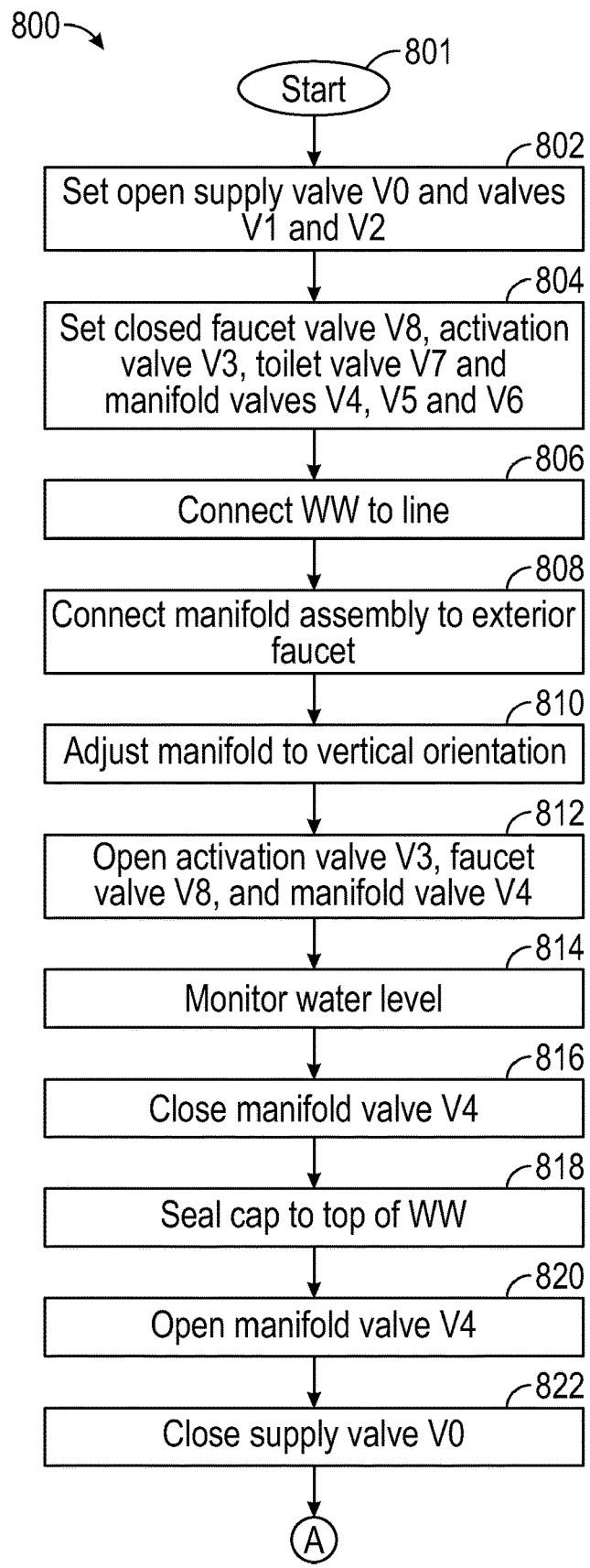
FIGS. 8A, 8B, and 8C show a flow chart of a preferred method for calculating a leak rate.
Figure 8B:
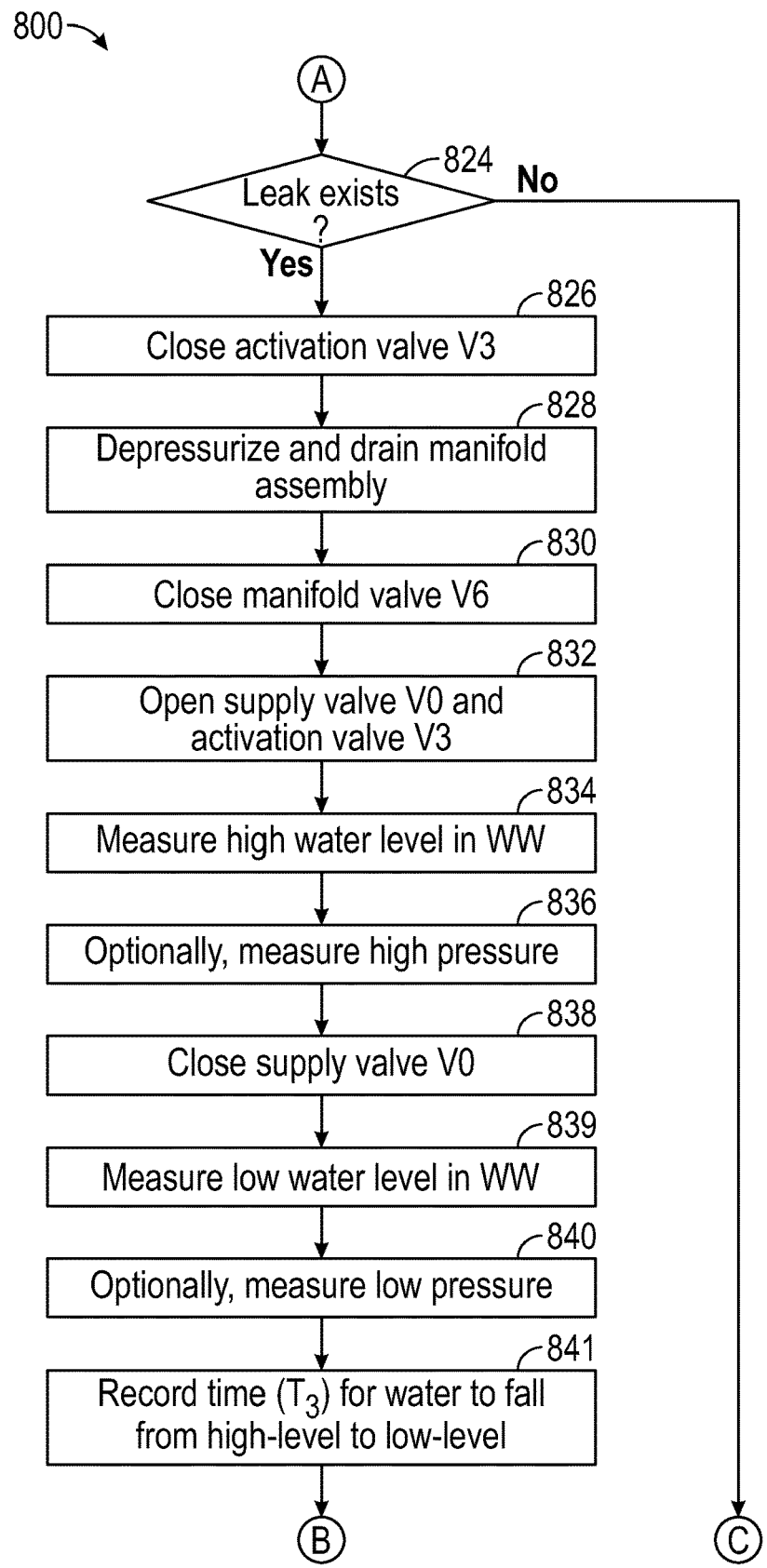
Figure 8C:
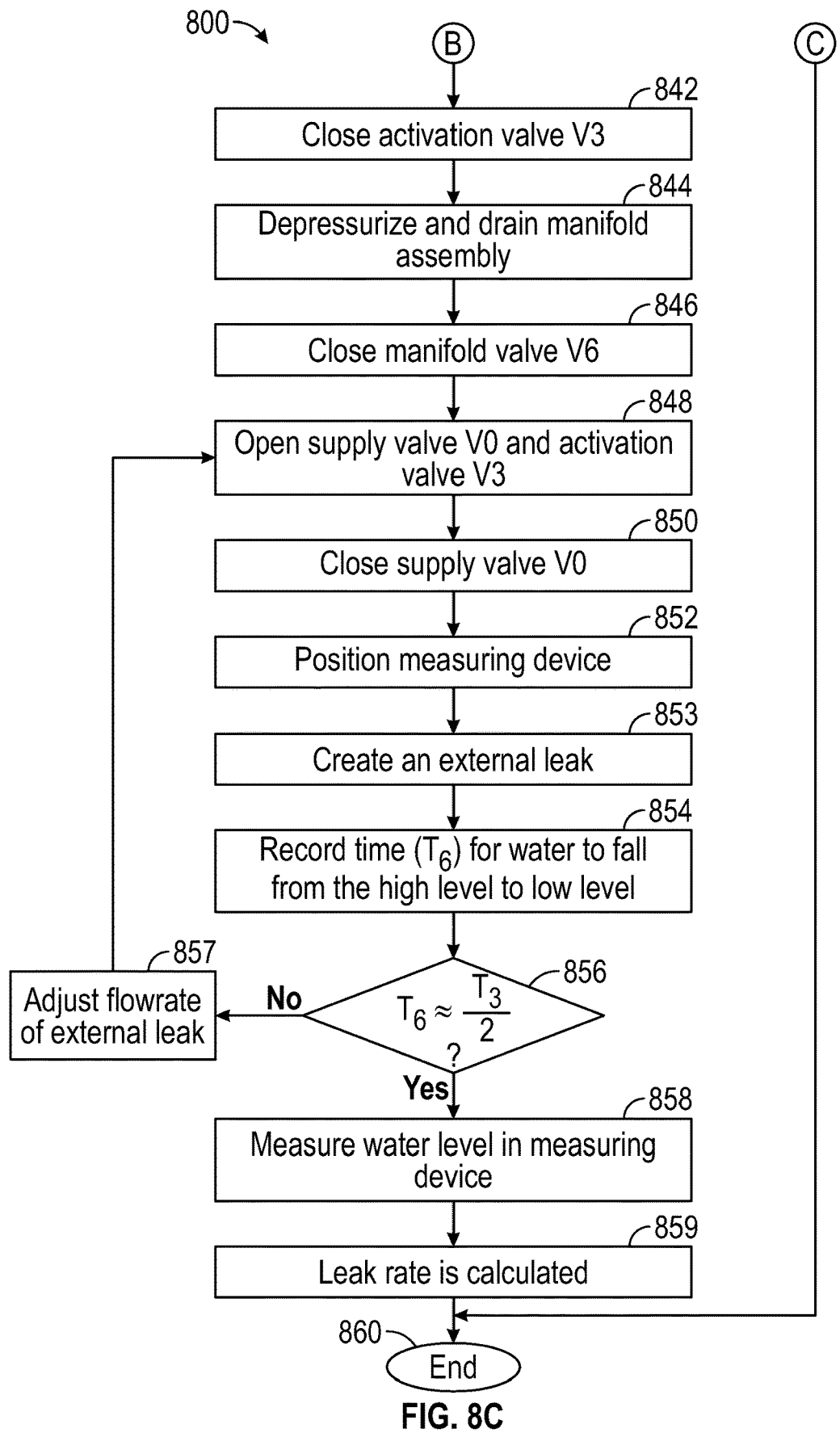

Referring to FIG. 8, method 800 for determining the leak rate using the WW in "flow matching mode" will be further described.

At step 801, the method begins.

At step 802, supply valve V0 and valves V1 and V2 are opened.

At step 804, faucet valve V8, activation valve V3, toilet valve V7 and manifold valves V4, V5, and V6 are closed.

At step 806, WW 131 is connected to line 130 via the threaded connector 208.

At step 808, the manifold assembly is connected to exterior faucet 121 via threaded connector 138.

At step 810, the manifold assembly is adjusted to a vertical orientation, using ball joint coupling 151 and bubble levels 152A and 152B.

At step 812, activation valve V3, faucet valve V8, and manifold valve V4 are opened.

At step 814, the water level in WW 131 is monitored until it is approximately equal to zero indicator line 224.

At step 816, manifold valve V4 is closed.

At step 818, removable cap 202 is sealed to top end 220 of WW 131.

At step 820, manifold valve V4 is opened to pressurize WW 131. Typically, when the WW is pressurized, the water level will rise near or above the 50-psi indicator line and stabilize. In an alternate embodiment, where cap 202 is not removable, steps 814 through 820 are not conducted.

At step 822, supply valve V0 is closed to disconnect the plumbing system from supply line 100.

At step 824, the water level in WW 130 is monitored to determine whether or not a leak exists. If the water level remains steady for a period of more than about 90 seconds, then it is assumed that no leak is present, and the method proceeds to step 860. If the water level falls after a period of about 90 seconds, then a leak is assumed to exist, and the method proceeds to step 826.

At step 826, activation valve V3 is closed.

At step 828, manifold assembly 120 is depressurized and drained, preferably by opening manifold valve V6.

At step 830, valve V6 is closed.

At step 832, WW 131 is pressurized. Preferably, by opening supply valve V0 and activation valve V3. The WW is typically considered pressurized when the water level in the WW remains constant for about 5 to 10 seconds. Typical heat pressure at the street for residential systems is between 40-60 psi. Once the height of the WW is pressurized the height of the water should stabilize, typically between about 3-4 inches on indicator lines 204, or about 50 psi on indicator lines 206.

At step 834, the high-level starting position water level in WW 131 is measured using water level indicator lines 204. Ideally, meniscus of the high-level starting position water level is measured to the nearest $10^{th}$ of an inch.

At step 836, optionally, the pressure level in the WW is measured using indicator lines 206 and recorded.

At step 838, supply valve V0 is closed, and the water level in the WW is allowed to be stabilized at a low-level ending position.

At step 839, the low-level ending position in WW 131 is observed and recorded using indicator lines 204. In practice, the low-level ending position should be about half of the high-level starting position. For example, the high-level starting position may be 60 psi, and the low-level ending position may be 30 psi.

At step 840, optionally, the pressure level in the WW is measured using indicator lines 206 and recorded.

At step 841, the elapsed time for the water level in WW 131 to fall from the high-level starting position to the low-level ending position is observed and recorded. This measurement will later be referred to as "$T_3$".

At step 842, activation valve V3 is closed.

At step 844, manifold assembly 120 is depressurized and drained, preferably by opening manifold valve V6.

At step 846, manifold valve V6 is closed.

At step 848, WW 131 is again pressurized, preferably by opening supply valve V0 and activation valve V3.

At step 850, supply valve V0 is closed when the water level reaches the high-level position.

At step 852, measuring device 192, preferably a cylindrical measuring container, is placed under the external leak at valve V6.

At step 853, an "external" leak is created by opening valve V6.

At step 854, the elapsed time for the water level in WW 131 to fall from the high-level starting position to the low-level ending position, with the external leak, is observed and recorded. This measurement will be later referred to as "$T_6$".

At step 856, a determination is made as to whether or not $T_6$ is equal to about half of $T_3$. If $T_6$ is equal to about half of $T_3$ then the method proceeds to step 858. If not, then the method proceeds to step 857.

The inventor has realized that if $T_6$ is about half of $T_3$, then the leak rate of the external leak is about equal to the leak rate of the internal leak. And so, the water loss from any internal leak inside structure 104 will be equivalent to the water loss from the external leak over any period of time.

At step 857, the flowrate of the external leak at valve V6 is adjusted and steps 848 through 856 are iteratively repeated until $T_6$ is about half of $T_3$.

At step 858, the volume of water in measuring container 192 is measured and recorded.

At step 859, the leak rate is calculated, as will be further described.

At step 860, the method concludes.

Figure 9:
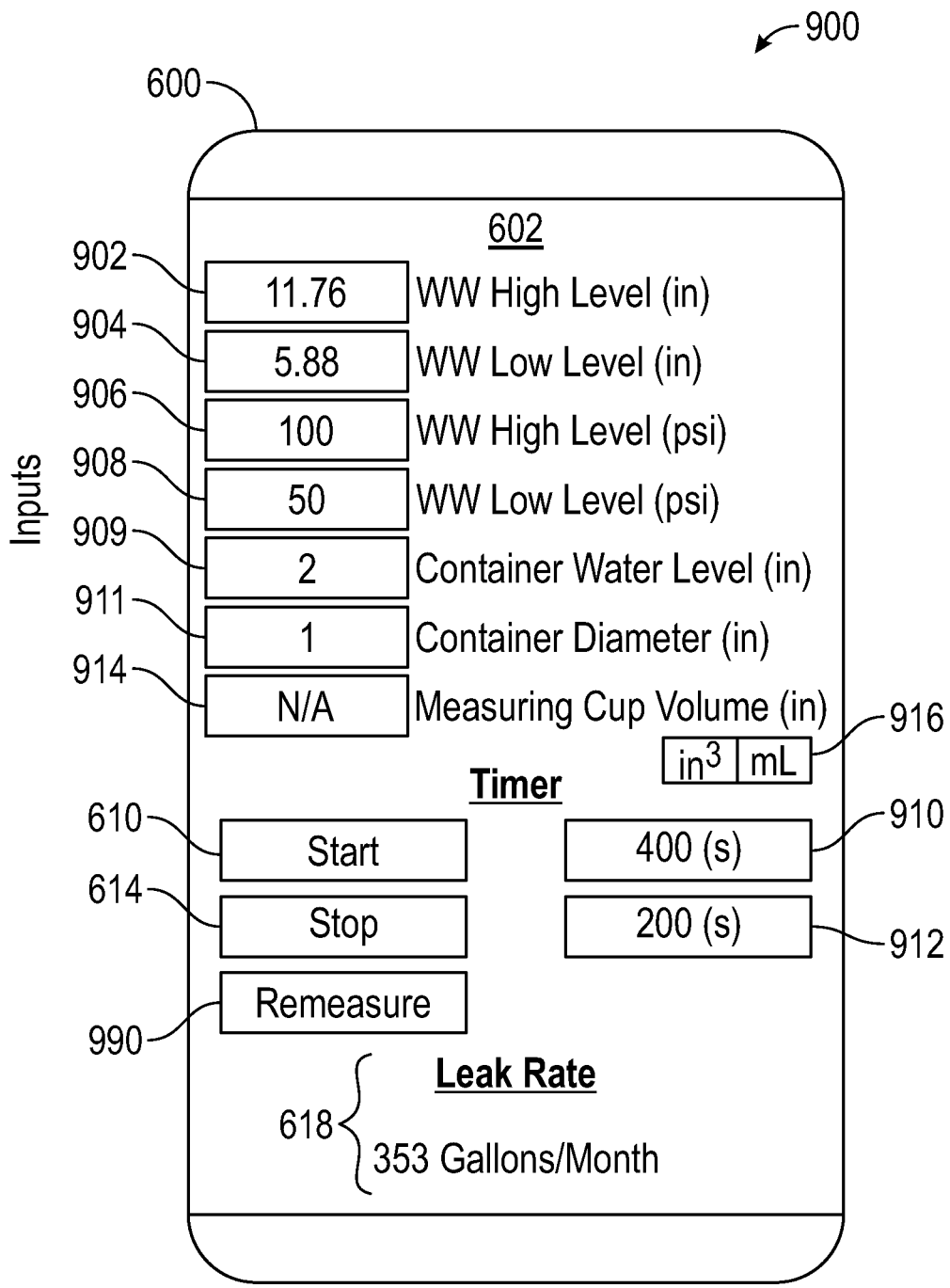
FIG. 9 is a preferred graphical user interface of a mobile application for the preferred leak detection system.
Figure 10A:
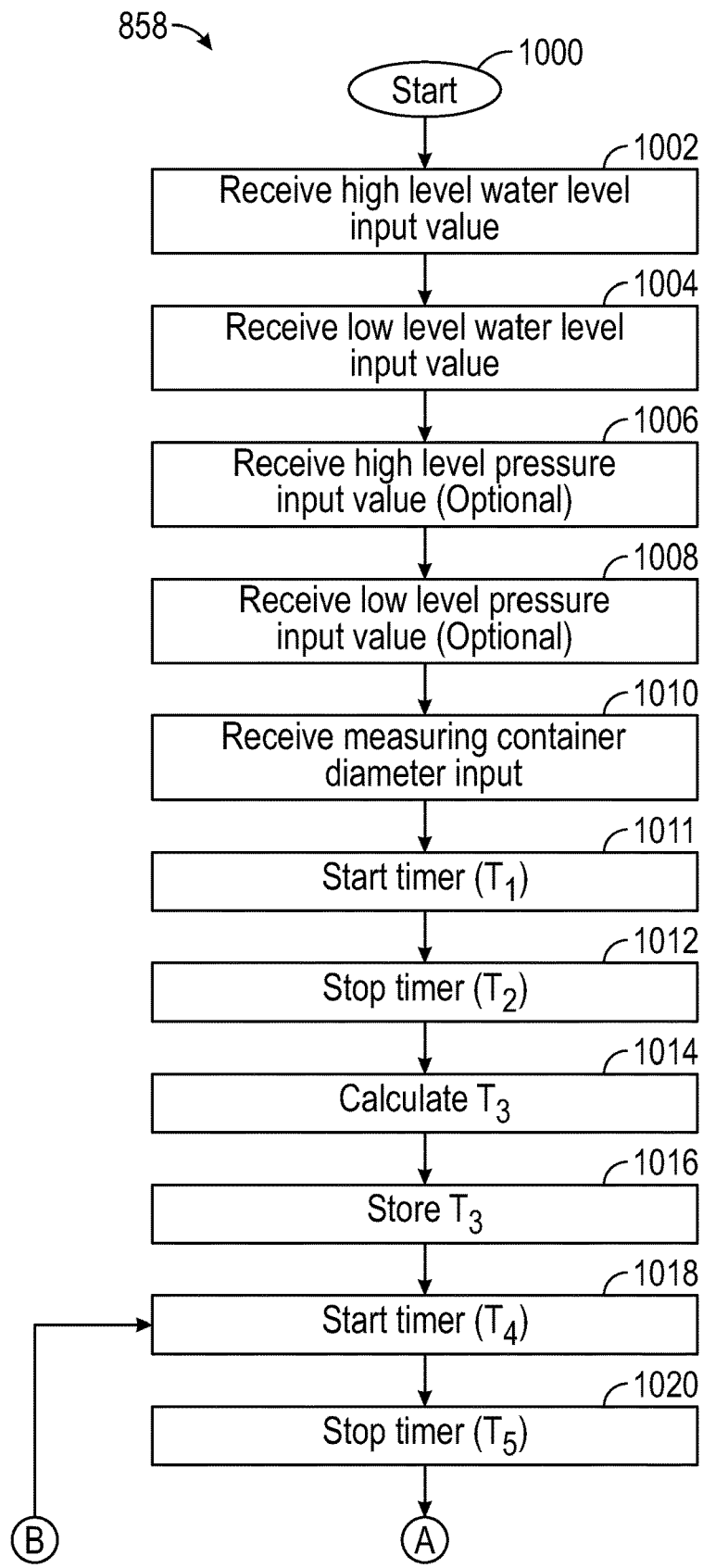
FIG. 10A and 10B show a flowchart of a preferred method of use of a mobile application for the preferred leak detection system.
Figure 10B:
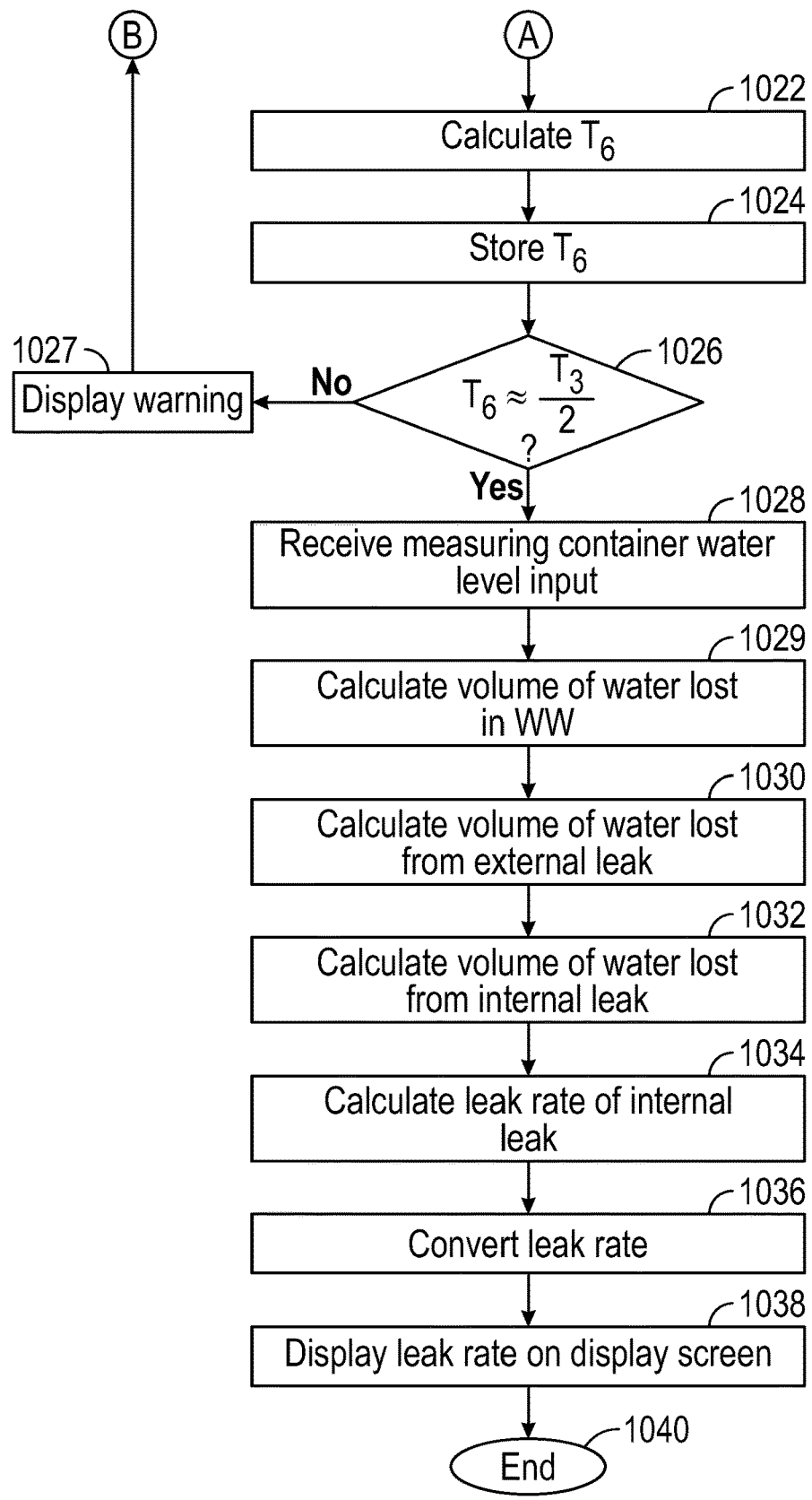

Referring to FIG. 9, mobile application display 900 will be further described. Mobile application display 900 is preferably generated by a python computer program that is resident in memory 154 of client device 134 and forms a mobile application.

Display 900 shows start button 610, stop button 614, high-level water level input 902, low-level water level input 904, high level pressure input 906, low-level pressure input 908, measuring container water level input 909, measuring container 192 diameter input 911, $T_1$ timer output 910, $T_2$ timer output 912, measuring container volume input 914, and measuring container input 916, and warning display 990. The mobile application further displays leak rate section 618.

Referring to figuring 10, the preferred method of step 858 for calculating the leak rate using the WW in flow matching mode and the mobile application will be further described.

At step 1000, the method begins.

At step 1002, the mobile application receives a value for a high-level water level input 902.

At step 1004, the mobile application receives a value for low-level water level input 904.

At step 1006, optionally, the mobile application receives a value for high-level pressure input 906.

At step 1008, optionally, the mobile application receives a value for low-level pressure input 908.

At step 1010, the mobile application receives a value for measurement container diameter input 911. In a preferred embodiment, the measuring container is cylindrical with known dimensions and volume.

In the alternative, measurement container 192 includes indicator lines representing volume. In this embodiment, the water volume observed is input into the mobile application at input 914 in lieu of water level input 909 and container diameter 911.

At step 1011, a selection of start button 610 is received and the mobile application starts a timer at $T_1$.

At step 1012, a selection of stop button 614 is received and the mobile applications stops the timer at $T_2$.

At step 1014, the mobile application calculates $T_3$. In a preferred embodiment, $T_3$ is the elapsed time in seconds for the water level in the WW to fall from the high-level input to the low-level input, with no external leak present. $T_3$ can be calculated by the following equation:

$$T_3 = T_2 - T_1$$

At step 1016, the mobile application stores the elapsed time, $T_3$.

At step 1018, a second selection of start button 610 is received and the mobile application starts a timer for a second time at $T_4$.

At step 1020, a second selection of stop button 614 is received and the mobile application stops the timer at $T_5$.

At step 1022, the mobile application calculates $T_6$. In a preferred embodiment, $T_6$ is the elapsed time in seconds for the water level in the WW to fall from the high-level input to the low-level input, with an external leak present. $T_6$ can be calculated by the following equation:

$$T_6 = T_5 - T_4$$

At step 1024, the mobile application stores the elapsed time, $T_6$.

At step 1026, the mobile application compares the $T_3$ to $T_6$ according to the following equation:

$$(0.4)T_3 \leq T_6 \leq (0.6)T_3$$

If $T_6$ is between about $(0.4)T_3$ and about $(0.6) T_3$, then the method proceeds to step 1028. If not, then the method proceeds to step 1027.

At step 1027, the mobile application prompts for another time measurement by activating warning display 990. The method then returns to step 1018.

At step 1028, the mobile application receives a value for measurement container 192 water level input 909.

At step 1029, the volume of water lost between the high-level position and the low-level position is calculated. In this calculation it is assumed the cross-sectional area of the WW 0.83 inches² and a baseline measurement of zero inches results from standard atmospheric pressure of 14.7 psi. For example, the high-level starting position may be 11.76 inches, and the low-level ending position is 5.88 inches.

$$V_{WW} = (h^1 - h^2)(A^{WW})$$

Where:

$V_{WW}$ is the volume of water lost from the high-level position to the low-level position in inches³.

$h^1$ is the height of the high-level position in inches;

$h^2$ is the height of the low-level position in inches;

$A^{WW}$ is the cross-sectional area of the WW in inches².

At step 1030, the volume of water lost from the external leak is calculated using the following equations:

$$V_{EL} = \frac{1}{2}V_{WW} + \frac{1}{2}V_x$$

$$V_{EL} = V_{mc}$$

$$V_{mc} = (h)(\pi)(r)^2$$

Where:

$V_{EL}$ is the volume of water lost through the external leak in inches³;

$V_{WW}$ is the volume of water lost from the high-level position to the low-level position in inches³;

$V_x$ is the volume of water lost from other pressurized areas within the plumbing system in inches³.

$V_{mc}$ is the volume of water in the measuring container from external leak in inches³;

h is the height of the water-level position in the measuring container in inches;

$\pi$ is a constant;

r is the radius of the cylindrical measuring container in inches.

At step 1032, the volume of the water lost from the internal leak is calculated using the following equations:

$$V_{IL} = \frac{1}{2}V_{WW} + \frac{1}{2}V_x$$

$$V_{EL} = \frac{1}{2}V_{WW} + \frac{1}{2}V_x$$

$$V_{EL} = V_{IL}$$

Where:

$V_{IL}$ is the volume of water lost from the internal leak in inches³;

$V_{WW}$ is the volume of water lost from the high-level position to the low-level position in inches³;

$V_x$ is the volume of water lost from other pressurized areas within the plumbing system in inches³.

At step 1034 the leak rate per second of the internal leak is calculated using the following equation:

$$R_{IL} = \frac{V_{IL}}{T_6}$$

Where:

$R_{IL}$ is the leak rate per second of the internal leak in inches³ per second.

$V_{IL}$ is the volume of water lost from the internal leak in inches³;

$T_6$ is the time in seconds that it takes for the water level to fall from the high-level input to the low-level input with the external leak present.

At step 1036, the internal leak rate ($R_{IL}$) is converted from cubic inches per second to gallons per month using the following equation:

$$\text{Leak Rate } \frac{\text{in}^3}{\text{sec}} \left( \frac{3,600 \text{ sec}}{1 \text{ hr}} \times \frac{24 \text{ hrs}}{1 \text{ day}} \times \frac{30 \text{ days}}{1 \text{ month}} \times \frac{0.004329 \text{ gallons}}{01 \text{ in}^3} \right) = \text{Leak Rate } \frac{\text{gallons}}{\text{month}}$$

At step 1038, the leak rate is displayed on display screen 602.

At step 1040, the method concludes.

The invention claimed is:

1. A method of determining an internal leak in a plumbing system using a manifold assembly and an external container, the plumbing system including a supply line and an activation valve, comprised of the steps of:
   connecting the manifold assembly to the activation valve;
   providing a monitor cylinder, having a cross-sectional area, connected to a manifold, through a first manifold valve;
   opening the first manifold valve to obtain a first water level in the monitor cylinder;
   closing the supply line;
   monitoring the first water level for a predetermined period of time to determine if a leak condition exists;
   if the leak condition exists, then draining the manifold and the monitor cylinder;
   opening the supply line to obtain a second water level the monitor cylinder;
   closing the supply line;
   monitoring and recording a first elapsed time for the second water level to drop from a first position to a second position in the monitor cylinder;
   depressurizing and draining the manifold by opening a second manifold valve;
   closing the second manifold valve;
   opening the supply line to obtain a third water level in the monitor cylinder;
   closing the supply line;
   creating an external leak with the second manifold valve;
   monitoring and recording a second elapsed time for the third water level to drop from the first position to the second position in the monitor cylinder;
   determining if the second elapsed time is about half of the first elapsed time; and
      if the second elapsed time is not about half of the first elapsed time, then iteratively adjusting a flowrate of the external leak until the second elapsed time is about half of the first elapsed time;
      if the second elapsed time is about half of the first elapsed time, then, determining an internal leak rate from the second elapsed time and the external leak.

2. The method of claim 1, wherein the step of connecting the manifold assembly to the activation valve further comprises:
   providing a ball joint coupling, connected between the activation valve and the manifold assembly, for achieving a vertical orientation of the monitor cylinder.

3. The method of claim 2, wherein the method further comprises:
   providing the manifold assembly with a set of bubble levels, for adjusting the monitor cylinder with the ball joint coupling.

4. The method of claim 3, wherein the method further comprises:
   providing the manifold assembly with a longitudinal central axis.

5. The method of claim 4, wherein the method further comprises:
   providing a first bubble level of the set of bubble levels oriented perpendicular to the longitudinal central axis.

6. The method of claim 5, wherein the method further comprises:
   providing a second bubble level of the set of bubble levels oriented parallel to the longitudinal central axis.

7. The method of claim 6, wherein the method further comprises:
   orienting the longitudinal central axis perpendicular to a vertical axis using the first bubble level and the second bubble level.

8. The method of claim 1, wherein the step of creating the external leak further comprises:
   removably positioning the external container adjacent the external leak.

9. The method of claim 1, wherein the method further comprises:
   measuring a volume of water captured by the external container from the external leak.

10. The method of claim 1, wherein the method further comprises measuring a volume of water lost by the monitor cylinder according to the equation:

$$V_{WW}=(h^1-h^2)(A^{WW})$$

Where:
   $V_{WW}$ is the volume of water lost in the monitor cylinder;
   $h^1$ is a first level of the first position;
   $h^2$ is second level of the second position; and
   $A^{WW}$ is the cross-sectional area of the monitor cylinder.

11. The method of claim 1, wherein the step of determining the internal leak rate is carried out according to the equation:

$$V_{ec}=(h)(\pi)(r)^2$$

Where:
   $V_{ec}$ is a volume of water in the external container;
   h is a height of a water-level position in the external container;
   $\pi$ is a constant; and
   r is a radius of the external container.

12. The method of claim 1, wherein the step of determining the internal leak rate is carried out according to the equation:

$$R_{IL} = \frac{V_{IL}}{T_6}$$

Where:
   $R_{IL}$ is the internal leak rate of the internal leak;
   $V_{IL}$ is a volume of water lost from the internal leak; and
   $T_6$ is the second elapsed time for the second water level to fall from the first position to the second position with the external leak present.

13. A leak measurement system for a plumbing system, the plumbing system having a supply line, connected to a supply valve, the supply valve further connected to a main line, the leak measurement system comprising:
   a manifold assembly;
   the manifold assembly, having a monitor cylinder, connected to an activation valve; the activation valve connected to the supply line;
   the monitor cylinder, having a cross-sectional area, connected to a manifold, through a first manifold valve;
   the manifold, further comprising a second manifold valve, ductedly connected to the activation valve;
   an external container adjacent the second manifold valve;
   a client device, having a display, an input device, and a memory, all operatively connected to a processor; and
   a set of instructions resident in the memory, that when executed, cause the processor to perform the steps of:

receiving a first water level position value of a water level in the monitor cylinder, resulting from opening the supply line;
receiving a second water level position value of the water level in the monitor cylinder;
receiving a first start timer input, corresponding to closing the supply line;
receiving a first stop timer input, corresponding to a water level in the monitor cylinder reaching the second water level position value;
calculating a first elapsed time from the first start timer input and the first stop timer input;
storing the first elapsed time;
receiving a second start timer input, corresponding to the water level reaching the first water level position value resulting from closing the supply line and repressurizing the manifold assembly after creating an external leak;
receiving a second stop timer input, corresponding to the water level reaching the second water level position value;
calculating a second elapsed time from the second start timer input and the second stop timer input;
storing the second elapsed time;
comparing the first elapsed time to the second elapsed time;
iteratively repeating the steps of:
  receiving the second start timer input;
  receiving the second stop timer input;
  calculating the second elapsed time;
  storing the second elapsed time;
  comparing the first elapsed time to the second elapsed time;
until the second elapsed time is equal to about half of the first elapsed time;
receiving a volume input representing a volume of water captured from the external leak in the external container; and
calculating a leak rate of an internal leak in the plumbing system from the volume input.

14. The leak measurement system of claim 13, wherein step of comparing the first elapsed time to the second elapsed time further comprises:
activating the display if the second elapsed time is not about half of the first elapsed time.

15. The leak measurement system of claim 13, wherein the set of instructions further comprises instructions that when executed cause the processor to perform the further steps of:

calculating a volume of water based on the first water level position value, the second water level position value, and the cross-sectional area.

16. The leak measurement system of claim 13, wherein the set of instructions further comprises instructions that when executed cause the processor to calculate the volume of water in the external container according to the following equation:

$$V_{ec} = (h)(\pi)(r)^2$$

Where:
$V_{ec}$ is the volume of water in the external container from the external leak;
h is a height of a water-level in the external container;
$\pi$ is a constant; and
r is a radius of the external container.

17. The leak measurement system of claim 13, wherein the step of calculating the leak rate is executed according to the following equation:

$$R_{IL} = \frac{V_{IL}}{T_6}$$

Where:
$R_{IL}$ is the leak rate of the internal leak;
$V_{IL}$ is the volume of water lost from the internal leak; and
$T_6$ is a time in seconds that it takes for the water level to fall from the first water level position value to the second water level position value with the external leak present.

18. The leak measurement system of claim 17, wherein the set of instructions further comprises instructions that when executed cause the processor to:
display the leak rate of the internal leak in the plumbing system on the display.

19. The leak measurement system of claim 13, wherein the set of instructions further comprises instructions that when executed cause the processor to:
receive a volume input, resulting from a water measurement according to a set of indicator lines on the external container.

20. The leak measurement system of claim 13, wherein the set of instructions further comprises instructions that when executed cause the processor to:
receive a value for a volume of water in the external container, corresponding to a water level in the external container.

* * * * *